United States Patent
Miklós et al.

(10) Patent No.: US 12,250,739 B2
(45) Date of Patent: Mar. 11, 2025

(54) CELLULAR COMMUNICATIONS SYSTEM SUPPORT FOR VIRTUAL ETHERNET BRIDGE MANAGEMENT

(71) Applicant: Telefonaktiebolaget LM Ericsson (publ), Stockholm (SE)

(72) Inventors: György Miklós, Pilisborosjenö (HU); János Farkas, Kecskemét (HU); János Harmatos, Budapest (HU); Balázs Varga, Budapest (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 406 days.

(21) Appl. No.: 17/598,257

(22) PCT Filed: Mar. 13, 2020

(86) PCT No.: PCT/IB2020/052336
§ 371 (c)(1),
(2) Date: Sep. 25, 2021

(87) PCT Pub. No.: WO2020/194113
PCT Pub. Date: Oct. 1, 2020

(65) Prior Publication Data
US 2022/0217794 A1 Jul. 7, 2022

Related U.S. Application Data

(60) Provisional application No. 62/824,346, filed on Mar. 27, 2019.

(51) Int. Cl.
*H04W 76/12* (2018.01)
*H04W 76/15* (2018.01)

(52) U.S. Cl.
CPC .......... *H04W 76/12* (2018.02); *H04W 76/15* (2018.02)

(58) Field of Classification Search
None
See application file for complete search history.

(56) References Cited

U.S. PATENT DOCUMENTS

| | | | |
|---|---|---|---|
| 7,979,592 B1 * | 7/2011 | Pettey | G06F 13/404 709/205 |
| 8,451,715 B1 * | 5/2013 | Doshi | H04L 45/66 370/242 |

(Continued)

OTHER PUBLICATIONS

U.S. Appl. No. 62/806,185, filed Feb. 15, 2019, Talebi Fard et al., "Device Configuration for Time Sensitive Network Bridge", p. 1-69, Figs. 1-46.*

(Continued)

*Primary Examiner* — Gregory B Sefcheck
(74) *Attorney, Agent, or Firm* — Weisberg I.P. Law, P.A.

(57) ABSTRACT

Systems and methods are disclosed herein that relate to a cellular communications system that operates as a virtual Ethernet bridge(s). Embodiments of a User Equipment (UE) for a cellular communications system and corresponding methods of operation of a UE are disclosed. In some embodiments, a UE for a cellular communications system, where the cellular communications system operates as multiple Ethernet network virtual bridges, comprises one or more transmitters, one or more receivers, and processing circuitry associated with the one or more transmitters and one or more receivers. The processing circuitry is configured to cause the UE to establish a first Protocol Data Unit (PDU) session to an Ethernet network via a first User Plane Function (UPF), wherein PDU sessions that connect to the Ethernet network via the first UPF are grouped into a first Ethernet network virtual bridge. In this manner, shared media in the Ethernet network can be avoided.

18 Claims, 14 Drawing Sheets

Option 1: the whole 5GS modelled as one TSN bridge

(56) References Cited

U.S. PATENT DOCUMENTS

| | | | |
|---|---|---|---|
| 10,568,061 | B1* | 2/2020 | Park ..................... H04W 76/34 |
| 11,463,929 | B2* | 10/2022 | Kim .................. H04W 36/0022 |
| 11,477,833 | B2* | 10/2022 | Miklós .................. H04W 76/25 |
| 2016/0239328 | A1* | 8/2016 | Kaplan ............... G06F 9/45558 |
| 2018/0199398 | A1* | 7/2018 | Dao .................... H04L 41/5041 |
| 2018/0270782 | A1* | 9/2018 | Park ..................... H04W 60/06 |
| 2019/0166647 | A1* | 5/2019 | Velev .................... H04W 76/00 |
| 2019/0223250 | A1* | 7/2019 | Dao ........................ H04W 76/22 |
| 2019/0238365 | A1* | 8/2019 | Sudhakaran ........ H04L 41/0893 |
| 2019/0394833 | A1* | 12/2019 | Talebi Fard ........ H04W 68/005 |
| 2020/0053828 | A1* | 2/2020 | Bharatia ............... H04W 76/11 |
| 2020/0267785 | A1* | 8/2020 | Talebi Fard ........ H04W 40/248 |
| 2021/0152615 | A1* | 5/2021 | Karampatsis ....... H04L 65/1016 |
| 2021/0211233 | A1* | 7/2021 | Zhang .................... H04L 45/28 |
| 2021/0219357 | A1* | 7/2021 | Talebi Fard .......... H04W 76/11 |
| 2022/0053390 | A1* | 2/2022 | Kim ..................... H04W 36/00 |
| 2023/0019215 | A1* | 1/2023 | Wang ..................... H04L 47/24 |

OTHER PUBLICATIONS

Drawings for Indian Patent Application No. 4420/CHE/2014, published Jul. 1, 2016, Samsung R & D Institute, Bangalore, India, 7 pages.

Examination Report for Indian Patent Application No. 202147048135, mailed Jul. 6, 2022, 6 pages.

Author Unknown, "Technical Specification Group Services and System Aspects; Study on enhancement of 5GS for Vertical and LAN Services (Release 16)," Technical Report 23.734, Version 16.0.0, 3GPP Organizational Partners, Dec. 2018, 107 pages.

Author Unknown, "Technical Specification Group Services and System Aspects; System Architecture for the 5G System; Stage 2 (Release 15)," Technical Specification 23.501, Version 15.4.0, 3GPP Organizational Partners, Dec. 2018, 236 pages.

Ericsson, "S2-187474: An overview of the IETF DetNet activity," Third Generation Partnership Project (3GPP), TSG-SA WG2 Meeting #128, Jul. 2-6, 2018, 7 pages, Vilnius, Lithuania.

Ericsson, "S2-1901721: Mapping of bridge port and QoS control in 5GS," Third Generation Partnership Project (3GPP), TSG-SA WG2 Meeting #131, Feb. 25-Mar. 1, 2019, 7 pages, Santa Cruz, Spain.

Ericsson, et al., "S2-1903364 5G bridge granularity," Third Generation Partnership Project (3GPP), TSG-SA WG2 Meeting #132, Apr. 8-12, 2019, 6 pages, Xi'an, China.

Ericsson, et al., "S2-1904721: Granularity of TSN bridge," Third Generation Partnership Project (3GPP), TSG-SA WG2 Meeting #132, Apr. 8-12, 2019, 3 pages, Xi'an, P.R. China.

Huawei, et al., "S2-1902897: 5GS Logical TSN bridge management," Third Generation Partnership Project (3GPP), Feb. 25-Mar. 1, 2019, 3 pages, Santa Cruz, Tenerife, ES.

International Search Report and Written Opinion for PCT/IB2020/052336, mailed Jun. 8, 2020, 14 pages.

Written Opinion for PCT/IB2020/052336, mailed Feb. 5, 2021, 8 pages.

International Preliminary Report on Patentability for PCT/IB2020/052336, mailed Jun. 15, 2021, 20 pages.

* cited by examiner

Option 1: the whole 5GS modelled as one TSN bridge

*Option 3: per UE based 5G virtual bridge*

*Option 4: per PDU session based 5G virtual bridge* per UPF based virtual bridge

*per UPF based virtual bridge*

CELLULAR COMMUNICATIONS SYSTEM SUPPORT FOR VIRTUAL ETHERNET BRIDGE MANAGEMENT

RELATED APPLICATIONS

This application is a 35 U.S.C. § 371 national phase filing of International Application No. PCT/IB2020/052336, filed Mar. 13, 2020, which claims the benefit of provisional patent application Ser. No. 62/824,346, filed Mar. 27, 2019, the disclosures of which are hereby incorporated herein by reference in their entireties.

TECHNICAL FIELD

The present disclosure relates to a cellular communications system and, in particular, to a cellular communications system that operates as a virtual Ethernet bridge(s) for an Ethernet network such as, e.g., a Time-Sensitive Networking (TSN) network.

BACKGROUND

A Third Generation Partnership Project (3GPP) Fifth Generation (5G) System (5GS) virtual bridge should emulate the behavior of a Time-Sensitive Networking (TSN) bridge in order to facilitate its integration with a TSN system and minimize the impact to other TSN entities such as a Centralized Network Configuration (CNC) station, a Central User Configuration (CUC) entity, end stations, and other bridges.

Two aspects require special attention when the granularity of the virtual TSN bridge (also referred to herein as a "logical" TSN bridge) is determined: (1) multiple Protocol Data Unit (PDU) sessions may be established from a User Equipment (UE) to different User Plane Functions (UPFs) and (2) Ethernet shared media is to be avoided.

Multiple PDU sessions from a UE to a TSN network via different UPFs may be established for redundant traffic transmission, as defined in the Ultra-Reliable Low-Latency Communication (URLLC) network. In order to facilitate the establishment of redundant paths, the different UPFs should also be visible for the TSN network so that the TSN network is aware of which paths are disjoint. Note also that multiple PDU sessions to different UPFs may also be established for other reasons such as traffic isolation.

In modern Ethernet networks, shared media interfaces are avoided so that an Ethernet link always connects two bridges or an endhost (end station) and a bridge. As shown in FIG. 1, case (A) would correspond to shared media where a single interface of the bridge/endhost on the left connects to two bridges. Modern Ethernet networks avoid such shared media as that slows down the convergence time of Ethernet control protocols significantly. Instead, if the bridge/endhost has two ports, it can connect to the two bridges separately over those separate ports (B). If separate ports are not available, an interim bridge needs to be inserted to connect to the two bridges (C). Note that the interim bridge in (C) may also be realized as a virtual entity. For the 5GS's TSN model, it is important to be compatible with modern Ethernet networks and avoid shared Ethernet media.

SUMMARY

Systems and methods are disclosed herein that relate to a cellular communications system that operates as a virtual Ethernet bridge(s). Embodiments of a User Equipment (UE) for a cellular communications system and corresponding methods of operation of a UE are disclosed. In some embodiments, a UE for a cellular communications system, where the cellular communications system operates as multiple Ethernet network virtual bridges, comprises one or more transmitters, one or more receivers, and processing circuitry associated with the one or more transmitters and the one or more receivers. The processing circuitry is configured to cause the UE to establish a first Protocol Data Unit (PDU) session to an Ethernet network via a first User Plane Function (UPF), wherein PDU sessions that connect to the Ethernet network via the first UPF are grouped into a first Ethernet network virtual bridge. In some embodiments, all PDU sessions that connect to the Ethernet network via the first UPF are grouped into the first Ethernet network virtual bridge. In this manner, shared media in the Ethernet network can be avoided.

In some embodiments, an identity of the first Ethernet network virtual bridge is bound to an identity of the first UPF.

In some embodiments, the Ethernet network is a Time-Sensitive Networking (TSN) network, and capabilities of each port in the UE are integrated as parts of a configuration of the first Ethernet network virtual bridge, which is notified to an TSN Application Function (AF) and delivered to a Centralized Network Controller (CNC) for TSN bridge registration and modification.

In some embodiments, the processing circuitry is further configured to cause the UE to establish a second PDU session to the Ethernet network via a second UPF, wherein PDU sessions that connect to the Ethernet network via the second UPF are grouped into a second Ethernet network virtual bridge. In some embodiments, all PDU sessions that connect to the Ethernet network via the second UPF are grouped into the second Ethernet network virtual bridge. In some embodiments, the UE is communicatively coupled to an Ethernet network end station for both the first PDU session and the second PDU session, e.g., via an internal Application Programming Interface (API). In some other embodiments, the UE is communicatively coupled to an Ethernet network end station for the first PDU session and the second PDU session via separate interfaces. In some embodiments, the separate interfaces are separate physical interfaces. In some other embodiments, the separate interfaces are separate logical interfaces. In some embodiments, the separate logical interfaces are separate APIs.

In some embodiments, the UE is communicatively coupled to an Ethernet network end station for the first PDU session and the second PDU session via separate interfaces to an Ethernet network interim switch. In some embodiments, the separate interfaces are separate physical interfaces. In some other embodiments, the separate interfaces are separate logical interfaces. In some embodiments, the separate logical interfaces are separate APIs.

In some embodiments, the Ethernet network is a Time-Sensitive Networking (TSN) network.

In some embodiments, a UE for a cellular communications system, where the cellular communications system operates as a plurality of Ethernet network virtual bridges, is adapted to establish a first PDU session to an Ethernet network via a first UPF, wherein PDU sessions that connect to the Ethernet network via the first UPF are grouped into a first Ethernet network virtual bridge.

In some embodiments, a method performed in a UE for a cellular communications system that operates as a plurality of Ethernet network virtual bridges comprises establishing a first PDU session to an Ethernet network via a first UPF, wherein PDU sessions that connect to the Ethernet network via the first UPF are grouped into a first Ethernet network virtual bridge.

Embodiments of a cellular communications system are also disclosed. In some embodiments, a cellular communications system that operates as a plurality of Ethernet network virtual bridges comprises a first UPF and a second UPF, wherein PDU sessions that connect to an Ethernet network via the first UPF are grouped into a first Ethernet network virtual bridge and PDU sessions that connect to the Ethernet network via the second UPF are grouped into a first Ethernet network virtual bridge.

In some embodiments, all PDU sessions that connect to the Ethernet network via the first UPF are grouped into the first Ethernet network virtual bridge.

In some embodiments, an identity of the first UPF is bound to an identity of the first Ethernet network virtual bridge.

In some embodiments, all PDU sessions that connect to the Ethernet network via the second UPF are grouped into the second Ethernet network virtual bridge.

In some embodiments, an identity of the second UPF is bound to an identity of the second Ethernet network virtual bridge.

In some embodiments, the Ethernet network is a TSN.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
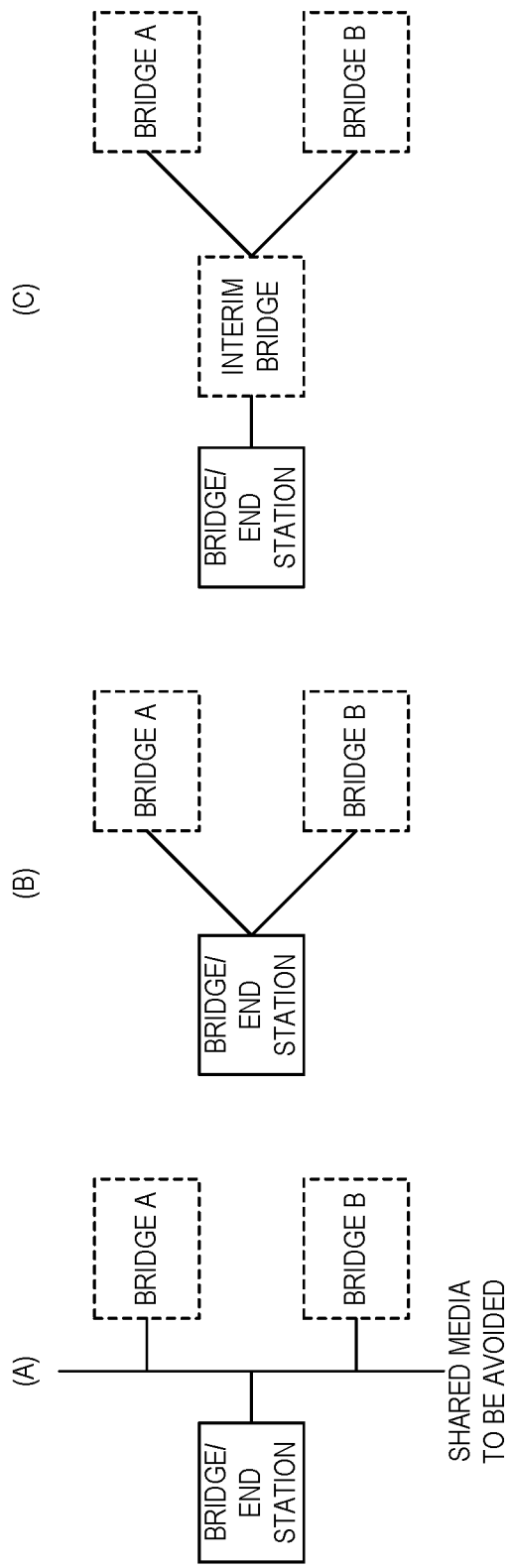
FIG. 1 illustrates the problem of shared media in an Ethernet network.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node (s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that while embodiments described herein focus on a 5G System (5GS), the present disclosure is not limited to the use of a 5GS. Any suitable cellular or mobile communications system may be used.

Systems and methods are disclosed herein for providing virtual Time-Sensitive Networking (TSN) bridges on a per UPF granularity to model the 5GS in the Ethernet network. In case in the terminal side the external TSN bridge/end station would connect to the UE in the 5GS over a single interface and the UE sets up two (or more) Protocol Data Unit (PDU) sessions to different UPFs (due to redundancy, traffic isolation, or any other reason), then an intermediate switch is inserted into the system to avoid the shared media. While the description primarily focuses on a TSN network and virtual TSN bridges, the embodiments described herein are more generally applicable to an Ethernet network and virtual Ethernet bridges.

Note that while the embodiments described herein are described with respect to a TSN, a TSN is one type of Ethernet network. As such, the embodiments described herein are more generally applicable to an Ethernet network.

There currently exist certain challenge(s) related to a 5G virtual TSN bridge. Below, three possible options are described. These three options are referred to herein as Option 1, Option 3, and Option 4. Problems associated with these options are also described below.

3GPP Technical Report (TR) 23.734 V16.0.0 Solution #8 provides an option for a 5GS appearing as a TSN bridge (black box) for integration with a TSN, as described in TR 23.734, Section 6.8. However, Solution #8 only illustrates the scenarios of a single UE via a UPF connected to a TSN. Further study is required to clarify the modelling of 5G virtual TSN bridges when multiple UEs and multiple UPFs are serving for a TSN, with the possibility that a single UE has multiple PDU sessions to different UPFs. The following options are analyzed for different granularities of a 5G virtual TSN bridge.

A first option ("Option 1") is an option in which there is a single virtual bridge including all UEs and UPFs. In other words, all UEs and UPFs serving for the specific TSN are grouped into a single virtual bridge. The bridge Identifier (ID) can be assigned by mobile operator or TSN operator. The capabilities of each port in the UEs and UPFs are integrated as parts of the configuration of the 5G virtual bridge, which is notified to a TSN Application Function (AF) and delivered to the Centralized Network Configuration (CNC) station for TSN bridge registration and modification. Any event of PDU session establishment/release may cause the reconfiguration of the 5G virtual bridge ports.

Figure 2:
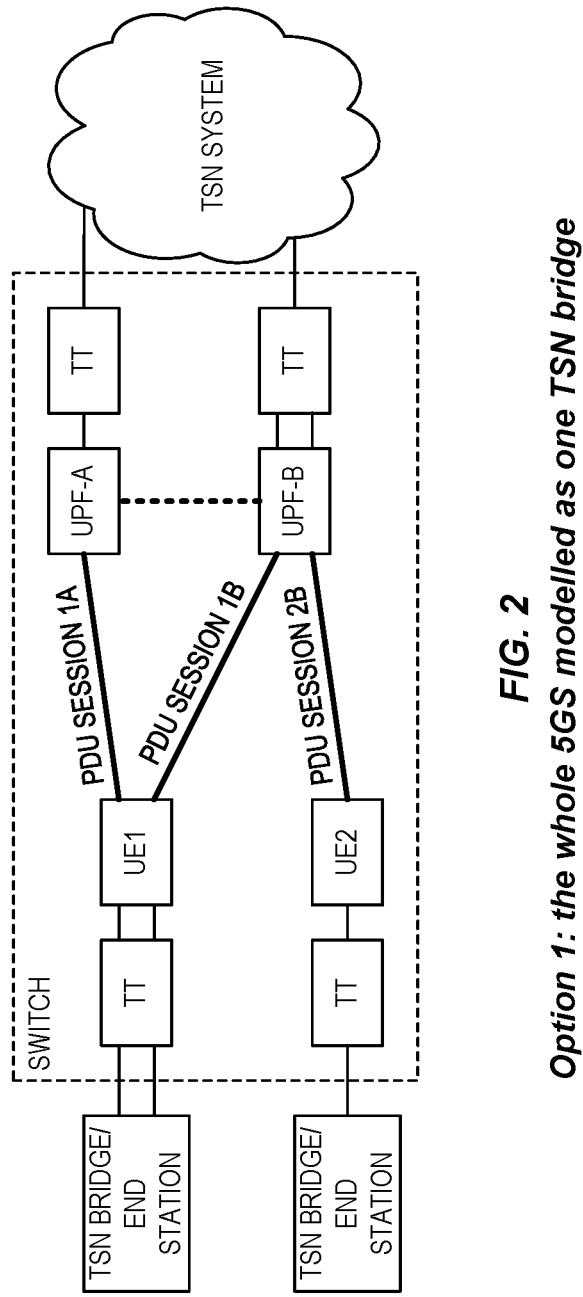
FIG. 2 illustrates multiple Protocol Data Unit (PDU) sessions from User Equipments (UEs) to a Time-Sensitive Networking (TSN) network via different User Plane Functions (UPFs) in an architecture in which the whole Fifth Generation (5G) System (5GS) is modelled as one virtual TSN bridge.

Multiple PDU sessions from a UE to a TSN network via different UPFs may be established for redundant traffic transmission or for traffic isolation. FIG. 2 illustrates this model. The whole 5GS is represented in the Ethernet network as a single bridge; as a consequence, the 5GS would have to behave like a single bridge and be able to switch Ethernet frames between any of its ports. This requires coordination between the UPFs, which is indicated with the dashed line in FIG. 2. It may happen that traffic may need to be forwarded between the UPFs because the single bridge model implies that, e.g., an incoming frame to one UPF may need to be switched to one of the UEs connected to another UPF. It may also happen that some Ethernet control protocols (e.g., for neighbor discovery, spanning tree, link aggregation) would have to be run in such a way that the control state is harmonized between the UPFs. In other words, the Ethernet functionality, both for Ethernet user plane and for Ethernet control signaling, would need to be coordinated between the UPFs. Note that this harmonization is for Ethernet functionality that is not within 3GPP scope.

There is currently no standardized way to realize a single logical Ethernet switch out of multiple distributed UPFs. Therefore, Option 1 may be suited either for single UPF deployments or for single-vendor UPF deployments. This causes problems for this solution to be standardized. Also, it is a disadvantage that this option hides the individual UPFs in the Ethernet (e.g., TSN) network which is a disadvantage in case redundancy is applied.

On the terminal side, the PDU sessions may correspond to physical UE ports as shown in FIG. 2. However, in case the UE has only a single interface to the TSN bridge/end station but sets up two PDU sessions, the UE would need to have a mapping function to map the uplink traffic into one of the PDU sessions based on configuration, which is an extra complexity. There is currently no standardized solution for how the network could map the traffic to one or the other PDU session in the terminal, which would be needed in case of this single bridge model.

Figure 3:
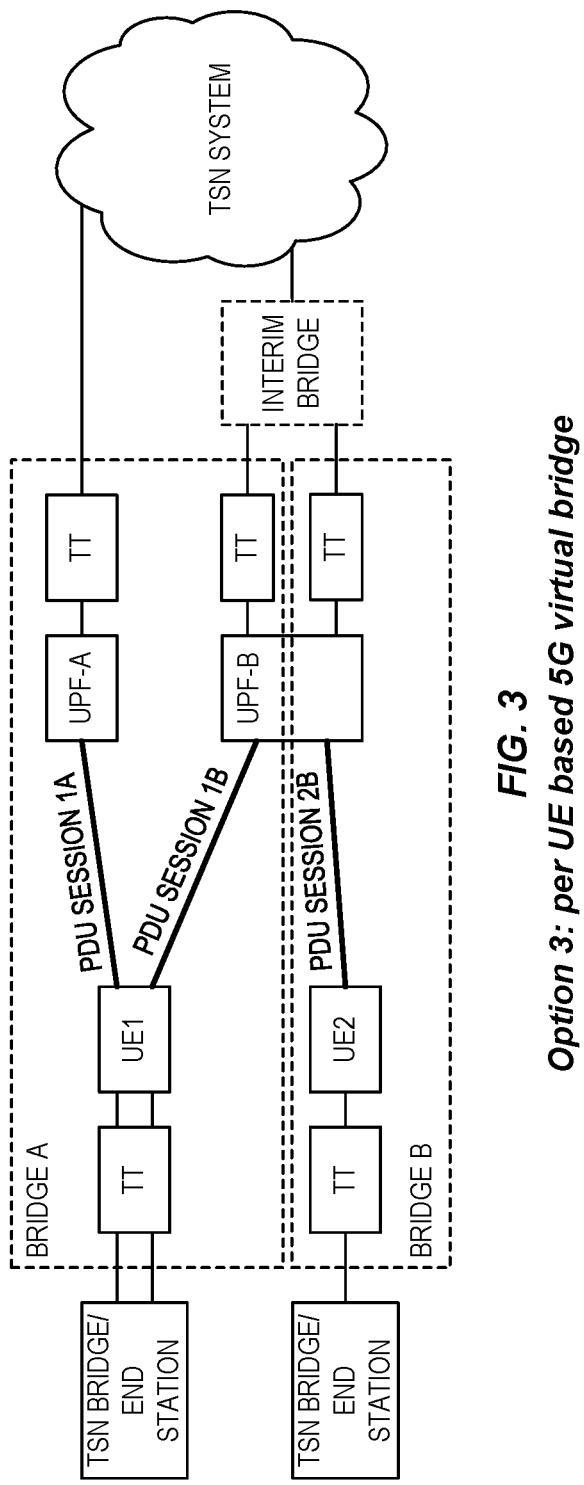
FIG. 3 illustrates multiple PDU sessions from UEs to a TSN network via different UPFs in an architecture in which the 5GS models per UE based virtual TSN bridges.

In another option, which is referred to herein as "Option 3," the 5GS implements per UE based 5G virtual bridge(s). Option 3 is illustrated in FIG. 3. In Option 3, each UE that has one or more PDU sessions to a specific TSN is treated as a virtual TSN bridge. The TSN AF may bind the bridge ID with the UE ID (such as Generic Public Subscription Identifier (GPSI)). The end points of each PDU session (in the UE and UPF) are bound as virtual ports of the virtual TSN bridge. Multiple PDU sessions from a UE to a TSN via different UPFs may be established for redundant traffic transmission or for traffic isolation. In this scenario, a virtual TSN bridge may span multiple UPFs. The virtual ports in the UE and the UPF are associated with PDU sessions.

A single UPF may serve many UEs, and hence a single UPF may be shared between many virtual TSN bridges. In case the UPF only has a single interface to the TSN network—which may be a typical scenario—then an interim bridge needs to be applied on the UPF side to avoid a shared Ethernet media. Note that this interim bridge may be a virtual one, and its behavior and configuration is outside of 3GPP scope. The configuration of such an interim bridge is an extra complexity. Furthermore, this approach does not scale well since the number of bridges, as well as the number of ports of the interim bridge, grows proportionally with the number of UEs which may be very large.

Figure 4:
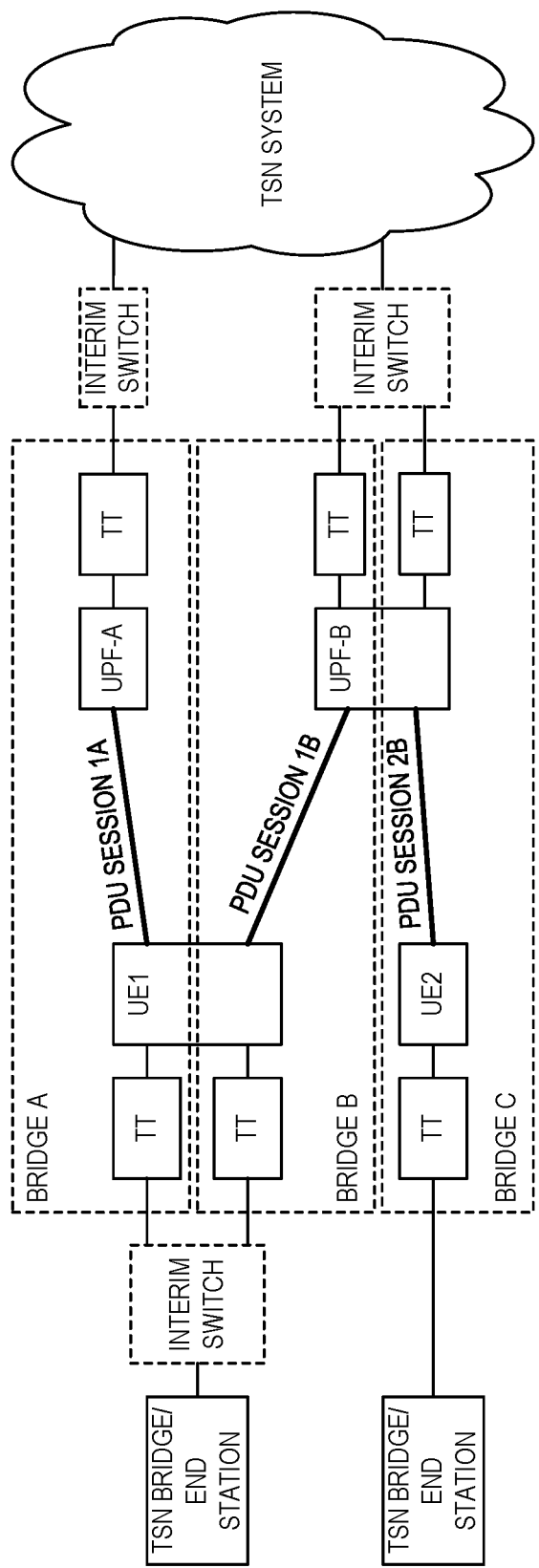
FIG. 4 illustrates multiple PDU sessions from UEs to a TSN network via different UPFs in an architecture in which the 5GS models per PDU session based virtual TSN bridges.

In another option, which is referred to herein as "Option 4", the 5GS provides per PDU session based 5G virtual bridge(s). Option 4 is illustrated in FIG. 4. In Option 4, each PDU session from a UE to a specific TSN is treated as a virtual TSN bridge. The TSN AF may bind the bridge ID with the UE ID and PDU session ID. The end points of each PDU session in the UE/TT and the UPF/TT (where "TT" is a "TSN Translator") are bound as a virtual port of the virtual TSN bridge. The virtual TSN bridges are in this case simple two-port relays.

Multiple PDU sessions from a UE to a TSN via different UPFs may be established for redundant traffic transmission or for traffic isolation. In this scenario, a UE and a UPF may span multiple virtual TSN bridges. The virtual ports in the UE and the UPF are strictly associated with PDU sessions. The interim bridge needs to be applied on both the UE side and the UPF side to avoid shared Ethernet media in case a single interface would need to connect to multiple bridges. Having interim bridges on both sides is an extra complexity. Furthermore, this approach does not scale well since the number of bridges, as well as the number of ports of the interim bridge, grows proportionally with the number of UEs which may be very large.

Certain aspects of the present disclosure and their embodiments may provide solutions to the aforementioned or other challenges associated with a 5G virtual TSN bridge.

In some embodiments, it is proposed to have virtual TSN bridges on a per UPF granularity to model the 5GS in the Ethernet network. In case in the terminal side the external TSN bridge/end station would connect to the UE in the 5GS over a single interface and the UE sets up two (or more) PDU sessions to different UPFs (due to redundancy, traffic isolation, or any other reason), then an intermediate switch is inserted into the system to avoid the shared media.

Certain embodiments may provide one or more of the following technical advantage(s). Embodiments of the present disclosure provide avoid shared media in the Ethernet network when utilizing a 5GS to provide a TSN virtual bridge(s). Shared media would significantly slow down the Ethernet control protocols, e.g. the Rapid Spanning Tree Protocol (RSTP) would be converted to the Spanning Tree Protocol (STP), which is significantly slower to converge at topology changes, e.g. may take on the order of 50 seconds to converge, whereas RSTP could converge in less than a few seconds. Modern Ethernet networks avoid shared media, hence the use of this solution makes the 5G based Ethernet network compatible with modern fixed Ethernet networks.

Figure 5:
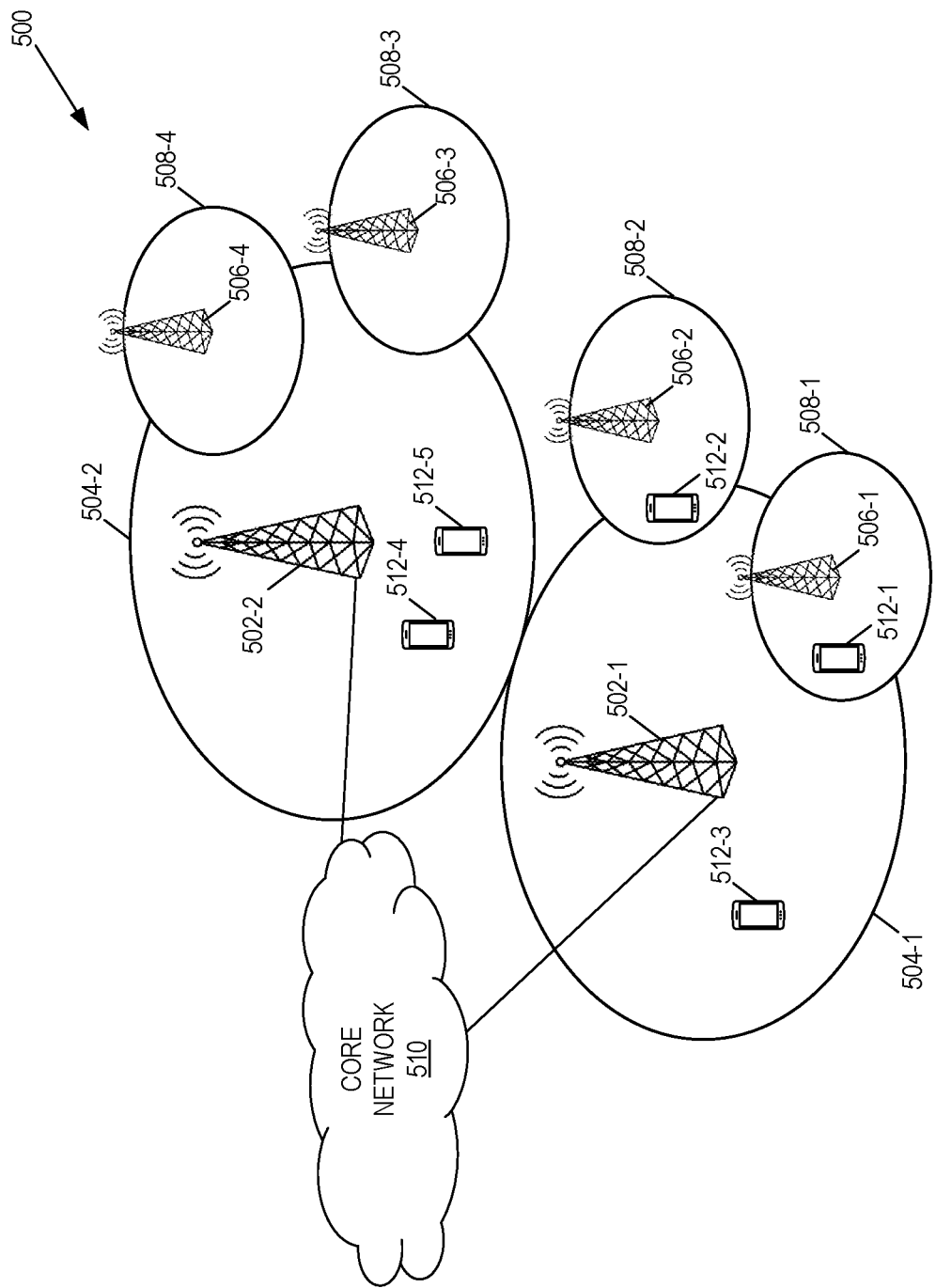
FIG. 5 illustrates one example of a cellular communications system that can be used to model multiple virtual Ethernet bridges (e.g., virtual TSN bridges) in accordance with embodiments of the present disclosure.

Before describing embodiments of the present disclosure in more detail, a brief discussion of a 5GS is beneficial. In this regard, FIG. 5 illustrates one example of a cellular communications system 500 according to some embodiments of the present disclosure. In the embodiments described herein, the cellular communications system 500 is a 5GS including a 5G NR RAN that includes base stations 502-1 and 502-2, which in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The 5G NR RAN may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The cellular communications system 502 also includes a core network 510 (e.g., a 5G Core (5GC)). The base stations 502 (and optionally the low power nodes 506) are connected to the core network 510.

The base stations 502 and the low power nodes 506 provide service to wireless devices 512-1 through 512-5 in the corresponding cells 504 and 508. The wireless devices 512-1 through 512-5 are generally referred to herein collectively as wireless devices 512 and individually as wireless device 512. The wireless devices 512 are also sometimes referred to herein as UEs.

Figure 6:
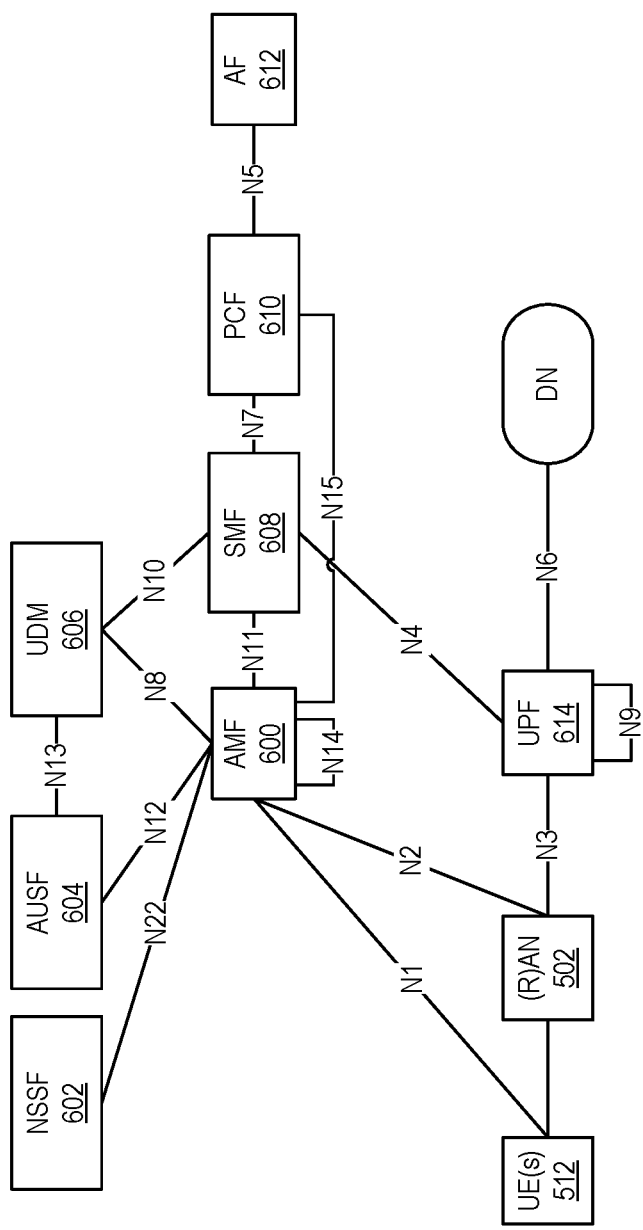
FIGS. 6 and 7 illustrate example 5GS architectures.

Seen from the access side the 5G network architecture shown in FIG. 6 comprises a plurality of UEs 512 connected to either a RAN or an Access Network (AN) (denoted by reference number 502) as well as an AMF 600. Typically, the R(AN) comprises base stations, e.g. such as eNBs or gNBs or similar. Seen from the core network side, the 5GC Network Functions (NFs) shown in FIG. 6 include a NSSF 602, an AUSF 604, a UDM 606, the AMF 600, a SMF 608, a PCF 610, an AF 612, and a UPF 614.

Reference point representations of the 5G network architecture are used to develop detailed call flows in the normative standardization. The N1 reference point is defined to carry signaling between the UE 512 and the AMF 600. The reference points for connecting between the AN 502 and the AMF 600 and between the AN 502 and the UPF 614 are defined as N2 and N3, respectively. There is a reference point, N11, between the AMF 600 and the SMF 608, which implies that the SMF 608 is at least partly controlled by the AMF 600. N4 is used by the SMF 608 and the UPF 614 so that the UPF 614 can be set using the control signal generated by the SMF 608, and the UPF 614 can report its state to the SMF 608. N9 is the reference point for the connection between different UPFs 614, and N14 is the reference point connecting between different AMFs 600, respectively. N15 and N7 are defined since the PCF 610 applies policy to the AMF 600 and the SMF 608, respectively. N12 is required for the AMF 600 to perform authentication of the UE 512. N8 and N10 are defined because the subscription data of the UE 512 is required for the AMF 600 and the SMF 608.

The 5GC network aims at separating user plane and control plane. The user plane carries user traffic while the control plane carries signaling in the network. In FIG. 6, the UPF 614 is in the user plane and all other NFs, i.e., the AMF 600, SMF 608, PCF 610, AF 612, NSSF 602, AUSF 604, and UDM 606, are in the control plane. Separating the user and control planes guarantees each plane resource to be scaled independently. It also allows UPFs 614 to be deployed separately from control plane functions in a distributed fashion. In this architecture, UPFs 614 may be deployed very close to UEs 512 to shorten the Round Trip Time (RTT) between UEs 512 and the data network for some applications requiring low latency.

The core 5G network architecture is composed of modularized functions. For example, the AMF 600 and the SMF 608 are independent functions in the control plane. Separating the AMF 600 and the SMF 608 allows independent evolution and scaling. Other control plane functions like the PCF 610 and the AUSF 604 can be separated as shown in FIG. 6. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 7:
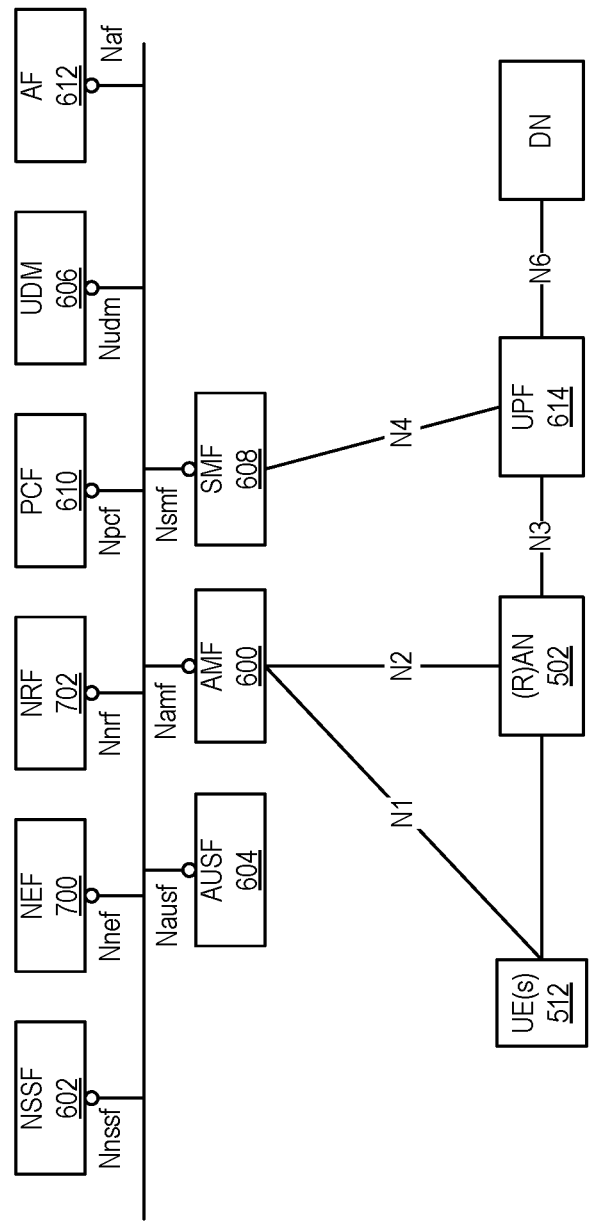

FIG. 7 illustrates a 5G network architecture using service-based interfaces between the NFs in the control plane instead of the point-to-point reference points/interfaces used in the 5G network architecture of FIG. 6. However, the NFs described above with reference to FIG. 6 correspond to the NFs shown in FIG. 7. The service(s) etc. that a NF provides to other authorized NFs can be exposed to the authorized NFs through the service-based interface. In FIG. 7 the service based interfaces are indicated by the letter "N" followed by the name of the NF, e.g. Namf for the service based interface of the AMF 600 and Nsmf for the service based interface of the SMF 608, etc. NEF 700 and the NRF 702 in FIG. 7 are not shown in FIG. 6 discussed above. However, it should be clarified that all NFs depicted in FIG. 6 can interact with the NEF 700 and the NRF 702 of FIG. 7 as necessary, though not explicitly indicated in FIG. 6.

Some properties of the NFs shown in FIGS. 6 and 7 may be described in the following manner. The AMF 600 provides UE-based authentication, authorization, mobility management, etc. A UE 512 even using multiple access technologies is basically connected to a single AMF 600 because the AMF 600 is independent of the access technologies. The SMF 608 is responsible for session management and allocates Internet Protocol (IP) addresses to UEs 512. It also selects and controls the UPF 614 for data transfer. If a UE 512 has multiple sessions, different SMFs 608 may be allocated to each session to manage them individually and possibly provide different functionalities per session. The AF 612 provides information on the packet flow to the PCF 610 responsible for policy control in order to support Quality of Service (QoS). Based on the information, the PCF 610 determines policies about mobility and session management to make the AMF 600 and SMF 608 operate properly. The AUSF 604 supports authentication function for UEs 512 or similar and thus stores data for authentication of UEs 512 or similar while the UDM 606 stores subscription data of the UE 512. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Now, a description of some example embodiments of the present disclosure will be provided. Systems and methods are disclosed herein for providing virtual TSN bridges on a per UPF granularity to model the 5GS in the Ethernet network. In case in the terminal side the external TSN bridge/end station would connect to the UE in the 5GS over a single interface and the UE sets up two (or more) PDU sessions to different UPFs (due to redundancy, traffic isolation, or any other reason), then an intermediate switch is inserted into the system to avoid the shared media.

In accordance with embodiments of the present disclosure, per UPF based 5G virtual bridges are provided. This is also referred to herein as "Option 2". For per UPF based 5G virtual bridges, all PDU sessions (serving for a specific TSN) which connect to a specific UPF are grouped into a single virtual bridge. A TSN AF may bind the bridge ID with the UPF ID. The capabilities of each port in the UEs and the UPF are integrated as parts of the configuration of the 5G virtual bridge, which is notified to the TSN AF and delivered to the CNC for TSN bridge registration and modification.

Multiple PDU sessions from a UE to a TSN via different UPFs may be established for redundant traffic transmission or for traffic isolation. In this scenario, a UE configured with multiple PDU sessions to different UPFs is shared by different virtual bridges. Each UE port (associated with a PDU session) belongs to one virtual bridge.

As this option exposes a separate virtual bridge for each UPF, there is no need for inter-UPF coordination of switching functionality; each UPF can implement Ethernet switching on its own.

Figure 8:
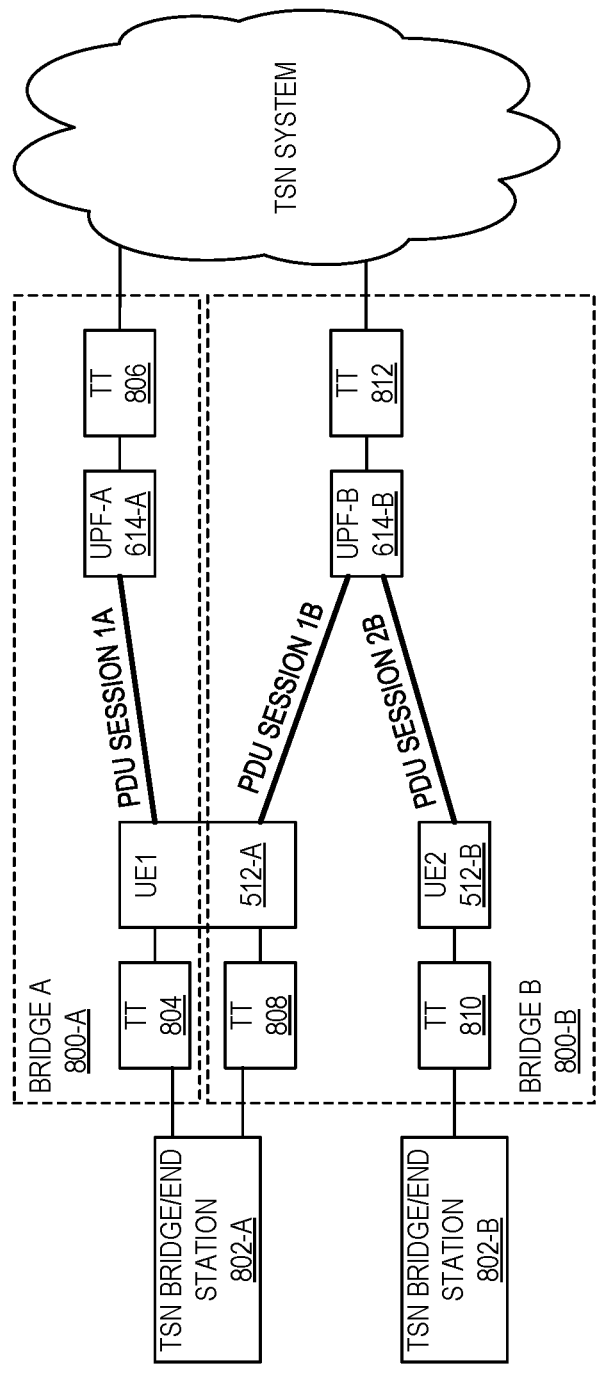
FIG. 8 illustrates an embodiment of the present disclosure in which the 5GS models per UPF based virtual TSN bridges.

FIG. 8 is an example illustration of per UPF based 5G virtual bridges in accordance with embodiments of the present disclosure. In this example, as illustrated, the 5GS implements a first virtual TSN bridge 800-A (denoted in FIG. 8 as "Bridge A") including a first UPF 614-A (denoted in FIG. 8 as "UPF-A"), and a second virtual TSN bridge 800-B (denoted in FIG. 8 as "Bridge B") including a second UPF 614-B (denoted in FIG. 8 as "UPF-B"). As illustrated, a first port of a first TSN bridge or TSN end station 802-A is connected to a UE-side H 804 associated with a first UE 512-A (denoted in FIG. 8 as "UE1"). The UE-side TT 804 together with the first UE 512-A, the first UPF 614-A, and a UPF-side TT 806 implement the first virtual TSN bridge 800-A. All PDU sessions for the particular TSN system shown (including a first PDU session from the first UE 512-A to the first UPF 614-A, which is denoted "PDU Session 1A") which connect to the first UPF 614-A are grouped into the first virtual TSN bridge 800-A. As illustrated, in this example, a second port of the first TSN bridge or end station 802-A is connected to a UE-side TT 808 associated with the first UE 512-A. In addition, a port of a second TSN bridge or end station 802-B is connected to a UE-side TT 810 associated with a second UE 512-B (denoted in FIG. 8 as "UE2"). The UE-side TTs 808 and 810 together with the UEs 512-A and 512-B, the second UPF 614-B, and a UPF-side TT 812 implement the second virtual TSN bridge 800-B. All PDU sessions for the particular TSN system shown (including a second PDU session from the first UE 512-A to the first UPF 614-A, which is denoted "PDU Session 1B", and a PDU session from the second UE 512-B to the second UPF 614-B, which is denoted "PDU Session 2B") which connect to the second UPF 614-B are grouped into the second virtual TSN bridge 800-B.

Figure 9:
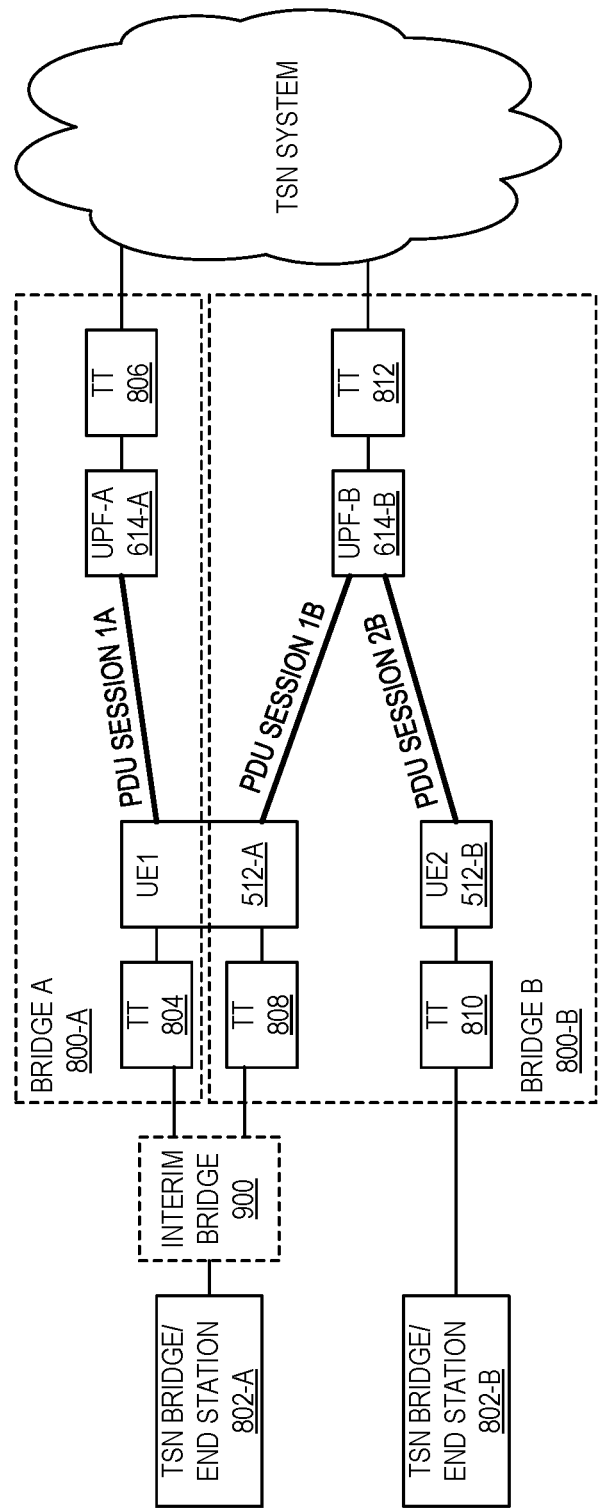
FIG. 9 illustrates another embodiment of the present disclosure in which the 5GS models per UPF based virtual TSN bridges.

In the special case when a UE has two (or more) PDU sessions to different UPFs, and the TSN bridge/endhost connects to the 5GS over a single interface, then an interim bridge 900 is utilized to avoid using a shared Ethernet media, as shown in FIG. 9. Note that such an interim bridge is only needed in special cases (i.e., multiple PDU sessions to different UPFs, and there is just a single interface from the TSN bridge/endhost). Note also that the interim bridge 900 does not necessarily correspond to a physical switch; it may be realized as a virtual bridge that may be co-located, e.g., with the terminal device. The functionality of this interim bridge 900 is outside of 3GPP scope, and it may be configured via Ethernet configuration methods. For example, a CNC and/or a Central User Configuration (CUC) and/or a Software-Defined Networking (SDN) controller may be responsible for setting up the interim bridge functionality, or it may be set up based on device preconfiguration.

Figure 10:
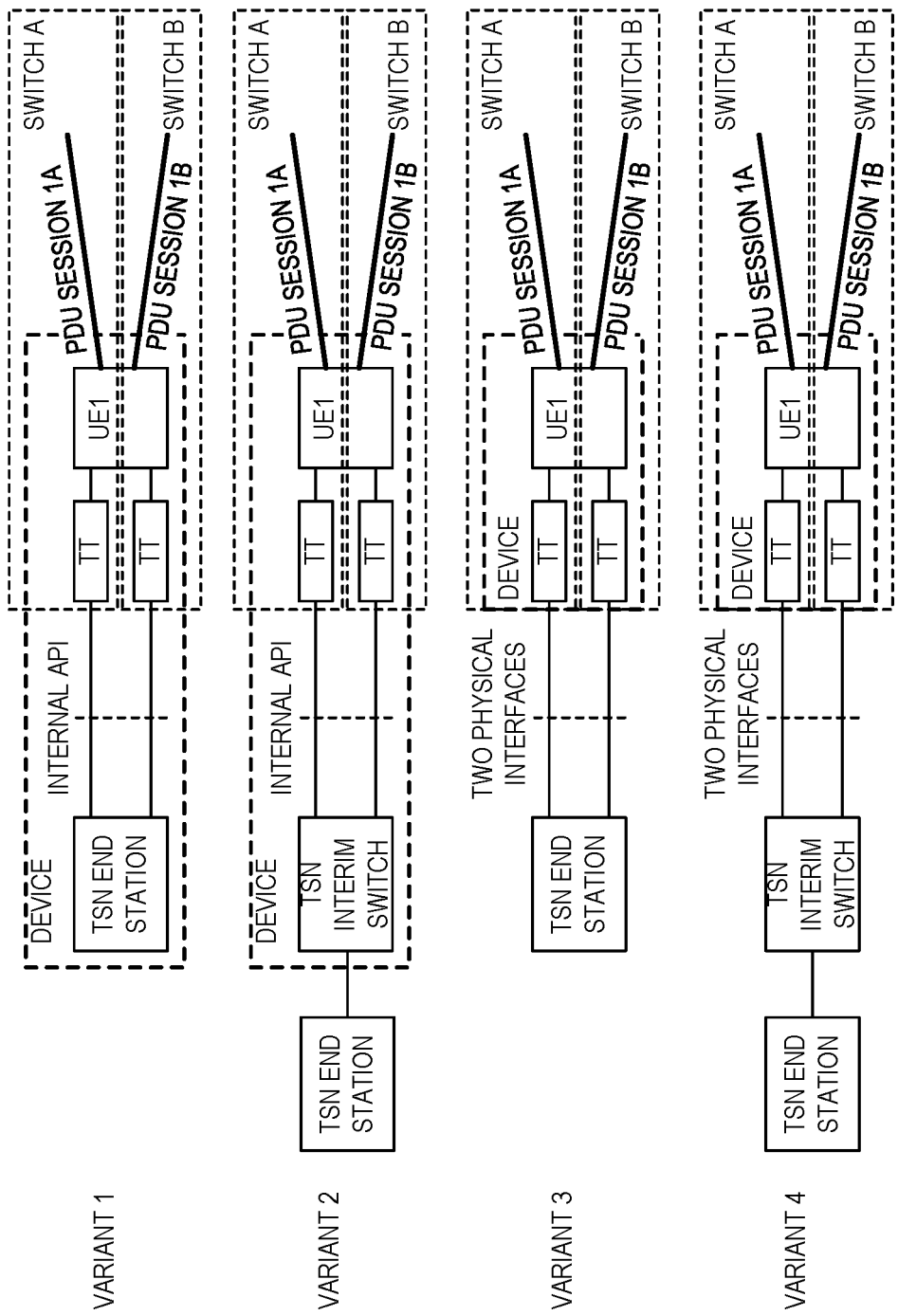
FIG. 10 shows different terminal variants in case a UE sets up two PDU sessions in accordance with embodiments of the present disclosure.

FIG. 10 shows different terminal variants in case the UE sets up two PDU sessions. The variants are different depending on whether the two PDU sessions are exposed via an internal Application Programming Interface (API) within the device (see, e.g., Variant 1 and Variant 2) or external physical interfaces (see, e.g., Variant 3 and Variant 4) and depending on whether the device has multiple physical ports or not (see, e.g., Variant 1 and Variant 3 where the device has two physical ports and Variant 2 and Variant 4 where the device has a single physical port). An interim bridge is needed in case the TSN bridge/endhost is connected over a single interface to the device, e.g., as illustrated for Variants 2 and 3.

The UE can set up the two (or multiple) PDU sessions in such a way that it can expect them to be served by different (logical) bridges. Appropriate parameter settings of the PDU sessions, such as the Data Network Name (DNN) and/or the Single Network Slice Selection Assistance Information (S-NSSAI) can serve for this purpose. However, it may happen that the network, due to some reason, does not eventually use different UPFs or different switches in its Ethernet model for the different UPFs. The terminal device or the interim switch may have means to detect whether the two PDU sessions connect to different switches. One possibility is that the Ethernet Link Layer Discovery Protocol (LLDP) protocol indicates the identity of the neighboring switch, and the terminal device or the interim switch may detect that it connects to the same neighbor based on getting the same LLDP information. Other methods may also be used, such as, e.g., an indication of the UPF identity, or the corresponding bridge's identity, may be signaled to the UE when the PDU session is set up, or other parameters may indicate whether or not the network succeeded in selecting different UPFs for the PDU sessions. The indication may be done via other identifiers, e.g., using a logical name for the connection. When the terminal device or the interim switch detects that it connects to the same (logical) switch over the two PDU sessions, the system may decide to fall back to a simpler configuration. This may involve releasing one of the PDU sessions and/or releasing the interim switch and/or replacing the interim switch with a simpler filter-based mapping function which just maps traffic to one of the PDU sessions based on filter criteria on the header fields.

Figure 11:
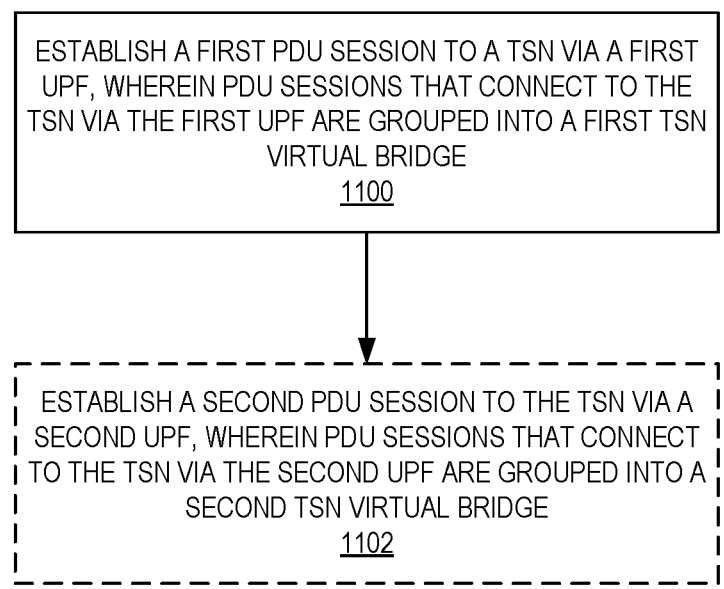
FIG. 11 is a flow chart that illustrates the operation of a UE in accordance with at least some aspects of the embodiments for per UPF based 5G virtual bridges described herein.

FIG. 11 is a flow chart that illustrates the operation of a UE (e.g., a UE 512) in accordance with at least some aspects of the embodiments for per UPF based 5G virtual bridges described herein. As illustrated, a UE in a cellular communications system (e.g., a cellular communications system 502 such as, e.g., a 5GS) that operates as TSN virtual bridges establish a first PDU session to a TSN via a first UPF, wherein PDU sessions that connect to the TSN via the first UPF are grouped into a first TSN virtual bridge (step 1100). In some embodiments, all PDU sessions that connect to the TSN via the first UPF are grouped into the first TSN virtual bridge. In some embodiments, the UE also establishes a second PDU session to the TSN via a second UPF, wherein PDU sessions that connect to the TSN via the second UPF are grouped into a second TSN virtual bridge (step 1102). In some embodiments, all PDU sessions that connect to the TSN via the second UPF are grouped into the second TSN virtual bridge.

As described above, in some embodiments, the UE is communicatively coupled to a TSN end station via an internal API. In some other embodiments, the UE is communicatively coupled to a TSN end station for the first PDU session and the second PDU session via separate interfaces (e.g., separate physical interfaces or separate logical interfaces (e.g., separate APIs)). In some other embodiments, the UE is communicatively coupled to a TSN end station for the first PDU session and the second PDU session via separate interfaces (e.g., separate physical interfaces or separate logical interfaces (e.g., separate APIs)) to a TSN interim switch.

Figure 12:
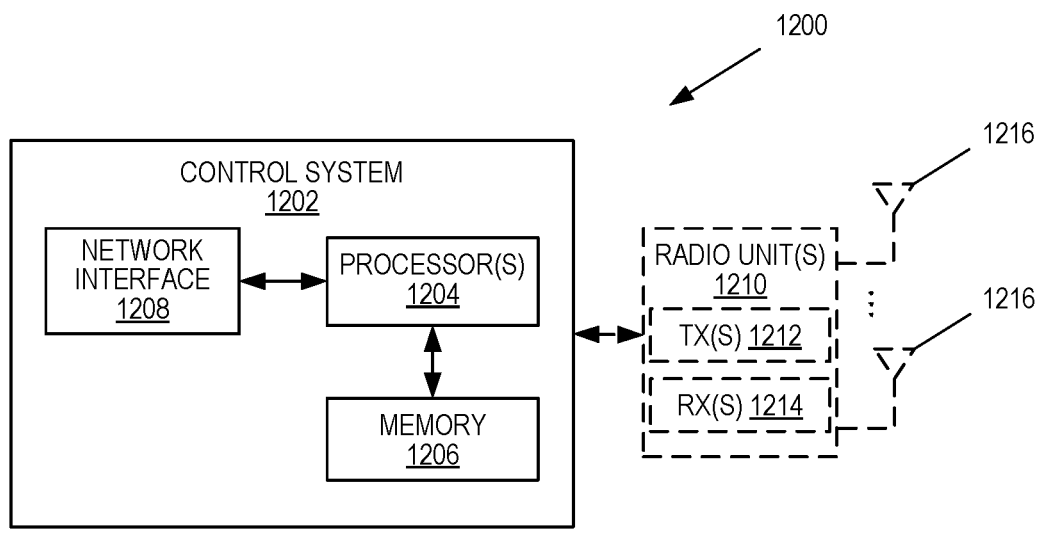
FIGS. 12 through 14 are schematic block diagrams of a network node that may incorporate aspects of the embodiments disclosed herein.

FIG. 12 is a schematic block diagram of a network node 1200 according to some embodiments of the present disclosure. Optional components are represented here with dashed lines. The network node 1200 may be, for example, radio access node (e.g., a base station 502 or 506 such as the gNB 212) or a core network node (e.g., a node implementing a core network function such as, e.g., a UPF). As illustrated, the network node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, if the network node 1200 is a radio access node, the network node 1200 also includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a network node 1200 (e.g., one or more functions of a base station or gNB or a UPF) as described herein. In some embodiments, the function(s) are implemented in software that is stored, e.g., in the memory 1206 and executed by the one or more processors 1204.

Figure 13:
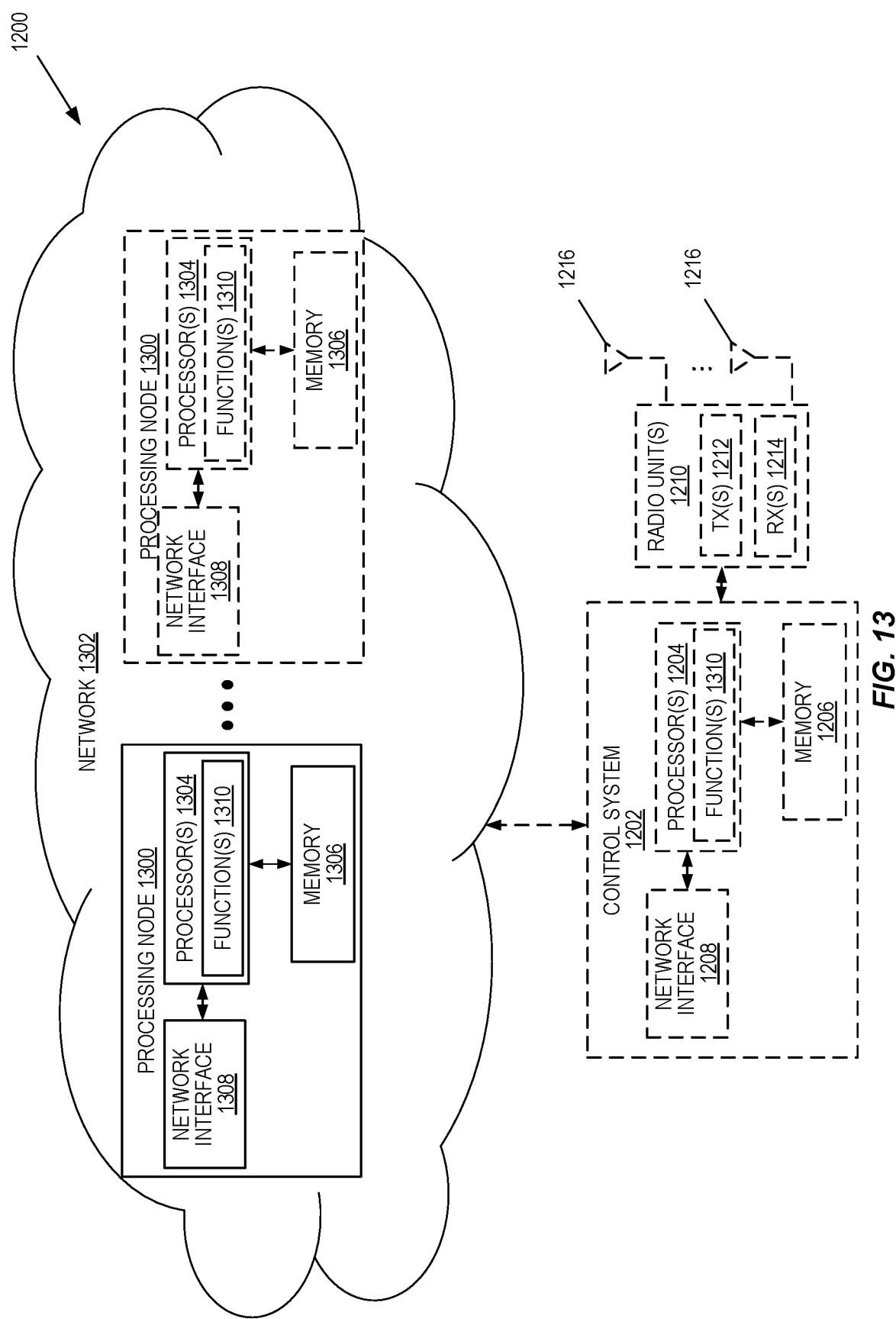

FIG. 13 is a schematic block diagram that illustrates a virtualized embodiment of the network node 1200 according to some embodiments of the present disclosure. Optional components are represented here with dashed lines. As used herein, a "virtualized" network node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the network node 1200 includes one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308. Optionally, the network node 1200 includes the control system 1202 that includes the one or more processors 1204 (e.g., CPUs, ASICs, FPGAs, and/or the like), the memory 1206, and the network interface 1208 and, if it is a radio access node, the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. If present, the control system 1202 is connected to the one or more processing nodes 1300.

In this example, functions 1310 of the network node 1200 described herein (e.g., one or more functions of a base station or gNB or a UPF) are implemented at the one or more processing nodes 1300 or distributed across the control system 1202 and the one or more processing nodes 1300 in any desired manner. In some particular embodiments, some or all of the functions 1310 of the network node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of network node 1200 or a node (e.g., a processing node 1300) implementing one or more of the functions 1310 of the network node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
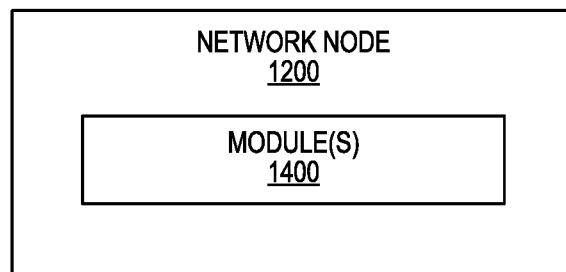

FIG. 14 is a schematic block diagram of the network node 1200 according to some other embodiments of the present disclosure. The network node 1200 includes one or more modules 1400, each of which is implemented in software. The module(s) 1400 provide the functionality of the network node 1200 described herein (e.g., one or more functions of a base station or gNB or a UPF). This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
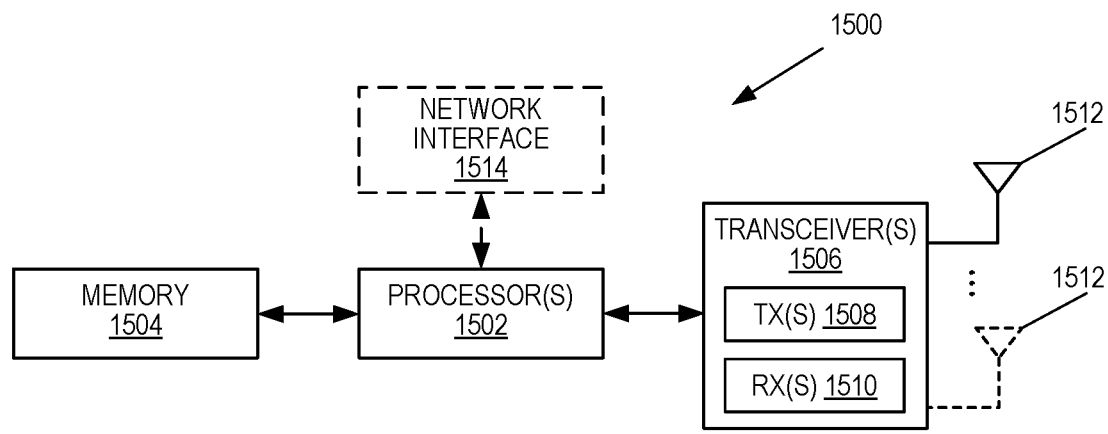
FIGS. 15 and 16 are schematic block diagrams of a UE that may incorporate aspects of the embodiments disclosed herein.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the UE 1500 includes a network interface 1514 or some other interface for providing the logical (e.g., API) or physical interfaces between the UE and the TSN end station or TSN interim switch as discussed above and illustrated in, e.g., FIGS. 8 through 10. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
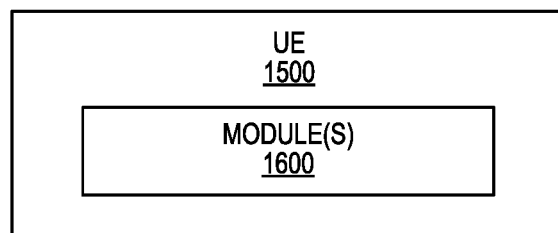

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Embodiments

1. A User Equipment, UE, (512, 1500) for a cellular communications system (502) where the cellular communications system (502) operates as a plurality of Ethernet network virtual bridges, the UE (512, 1500) comprising:
   one or more transmitters (1508);
   one or more receivers (1510); and
   processing circuitry (1502) associated with the one or more transmitters (1508) and the one or more receivers (1510), the processing circuitry (1502) configured to cause the UE (512, 1500) to establish a first Protocol Data Unit, PDU, session to an Ethernet network via a first User Plane Function, UPF, wherein PDU sessions that connect to the Ethernet network via the first UPF are grouped into a first Ethernet network virtual bridge.
2. The UE (512, 1500) of embodiment 1 wherein all PDU sessions that connect to the TSN via the first UPF are grouped into the first Ethernet network virtual bridge.
3. The UE (512, 1500) of embodiment 1 or 2 wherein the UE (512, 1500) is further adapted to establish a second PDU session to the Ethernet network via a second UPF, wherein PDU sessions that connect to the Ethernet network via the second UPF are grouped into a second Ethernet network virtual bridge.
4. The UE (512, 1500) of embodiment 3 wherein all PDU sessions that connect to the Ethernet network via the second UPF are grouped into the second Ethernet network virtual bridge.
5. The UE (512, 1500) of embodiment 3 or 4 wherein the UE (512, 1500) is communicatively coupled to an Ethernet network end station via an internal Application Programming Interface, API.
6. The UE (512, 1500) of embodiment 3 or 4 wherein the UE (512, 1500) is communicatively coupled to an Ethernet network end station for the first PDU session and the second PDU session via separate interfaces (e.g., separate physical interfaces or separate logical interfaces (e.g., separate APIs)).
7. The UE (512, 1500) of embodiment 3 or 4 wherein the UE (512, 1500) is communicatively coupled to an Ethernet network end station for the first PDU session and the second PDU session via separate interfaces (e.g., separate physical interfaces or separate logical interfaces (e.g., separate APIs)) to an Ethernet network interim switch.

8. A User Equipment, UE, (512, 1500) for a cellular communications system (502) where the cellular communications system operates as a plurality of Ethernet network virtual bridges, the UE (512, 1500) adapted to:
    establish a first PDU session to an Ethernet network via a first User Plane Function, UPF, wherein Protocol Data Unit, PDU, sessions that connect to the Ethernet network via the first UPF are grouped into a first Ethernet network virtual bridge.
9. The UE (512, 1500) of embodiment 8 wherein all PDU sessions that connect to the Ethernet network via the first UPF are grouped into the first Ethernet network virtual bridge.
10. The UE (512, 1500) of embodiment 8 or 9 wherein the UE (512, 1500) is further adapted to establish a second PDU session to the Ethernet network via a second UPF, wherein PDU sessions that connect to the Ethernet network via the second UPF are grouped into a second Ethernet network virtual bridge.
11. The UE (512, 1500) of embodiment 10 wherein all PDU sessions that connect to the Ethernet network via the second UPF are grouped into the second Ethernet network virtual bridge.
12. The UE (512, 1500) of embodiment 10 or 11 wherein the UE (512, 1500) is communicatively coupled to an Ethernet network end station via an internal Application Programming Interface, API.
13. The UE (512, 1500) of embodiment 10 or 11 wherein the UE (512, 1500) is communicatively coupled to an Ethernet network end station for the first PDU session and the second PDU session via separate interfaces (e.g., separate physical interfaces or separate logical interfaces (e.g., separate APIs)).
14. The UE (512, 1500) of embodiment 10 or 11 wherein the UE (512, 1500) is communicatively coupled to an Ethernet network end station for the first PDU session and the second PDU session via separate interfaces (e.g., separate physical interfaces or separate logical interfaces (e.g., separate APIs)) to an Ethernet network interim switch.
15. The UE of any one of embodiments 1 to 14 wherein the Ethernet network is a Time-Sensitive Network, TSN.
16. A method performed in a User Equipment, UE, (512, 1500) in a cellular communications system (502) that operates as a plurality of Ethernet network virtual bridges, the method comprising:
    establishing (1100) a first Protocol Data Unit, PDU, session to an Ethernet network via a first User Plane Function, UPF, wherein PDU sessions that connect to the Ethernet network via the first UPF are grouped into a first Ethernet network virtual bridge.
17. The method of embodiment 16 wherein all PDU sessions that connect to the Ethernet network via the first UPF are grouped into the first Ethernet network virtual bridge.
18. The method of embodiment 16 or 17 further comprising establishing (1102) a second PDU session to the Ethernet network via a second UPF, wherein PDU sessions that connect to the Ethernet network via the second UPF are grouped into a second Ethernet network virtual bridge.
19. The method of embodiment 18 wherein all PDU sessions that connect to the Ethernet network via the second UPF are grouped into the second Ethernet network virtual bridge.
20. The method of embodiment 18 or 19 wherein the UE (512, 1500) is communicatively coupled to an Ethernet network end station via an internal Application Programming Interface, API.
21. The method of embodiment 18 or 19 wherein the UE (512, 1500) is communicatively coupled to an Ethernet network end station for the first PDU session and the second PDU session via separate interfaces (e.g., separate physical interfaces or separate logical interfaces (e.g., separate APIs)).
22. The method of embodiment 18 or 19 wherein the UE (512, 1500) is communicatively coupled to an Ethernet network end station for the first PDU session and the second PDU session via separate interfaces (e.g., separate physical interfaces or separate logical interfaces (e.g., separate APIs)) to an Ethernet network interim switch.
23. The method of any one of embodiments 16 to 22 wherein the Ethernet network is a Time-Sensitive Network, TSN.
24. A cellular communications system (502) that operates as a plurality of Ethernet network virtual bridges, the cellular communications system (502) comprising:
    a first User Plane Function, UPF;
    a second UPF;
    wherein Protocol Data Unit, PDU, sessions that connect to an Ethernet network via the first UPF are grouped into a first Ethernet network virtual bridge and PDU sessions that connect to the Ethernet network via the second UPF are grouped into a first Ethernet network virtual bridge.
25. The cellular communications system (502) of embodiment 24 wherein all PDU sessions that connect to the Ethernet network via the first UPF are grouped into the first Ethernet network virtual bridge.
26. The cellular communications system (502) of embodiment 24 or 25 wherein all PDU sessions that connect to the Ethernet network via the second UPF are grouped into the second Ethernet network virtual bridge.
27. The cellular communications system (502) of any one of embodiments 24 to 26 wherein the Ethernet network is a Time-Sensitive Network, TSN.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Management Function
AN Access Network
API Application Programming Interface
ASIC Application Specific Integrated Circuit
AUSF Authentication Server Function
CNC Centralized Network Configuration
CPU Central Processing Unit
CUC Central User Configuration
DN Data Network
DNN Data Network Name
DSP Digital Signal Processor
eNB Enhanced or Evolved Node B
FPGA Field Programmable Gate Array
gNB New Radio Base Station
GPSI Generic Public Subscription Identifier HSS Home Subscriber Server
ID Identifier
IP Internet Protocol
LLDP Link Layer Discovery Protocol
LTE Long Term Evolution
MME Mobility Management Entity
MTC Machine Type Communication
NEF Network Exposure Function
NF Network Function
NR New Radio
NRF Network Repository Function
NSSF Network Slice Selection Function
PCF Policy Control Function
PDU Protocol Data Unit
P-GW Packet Data Network Gateway
QoS Quality of Service
RAM Random Access Memory
RAN Radio Access Network
ROM Read Only Memory
RRH Remote Radio Head
RSTP Rapid Spanning Tree Protocol
RTT Round Trip Time
SCEF Service Capability Exposure Function
SDN Software-Defined Networking
SMF Session Management Function
S-NSSAI Single Network Slice Selection Assistance Information
STP Spanning Tree Protocol
TR Technical Report
TSN Time-Sensitive Networking
TT Time-Sensitive Networking Translator
UDM Unified Data Management
UE User Equipment
UPF User Plane Function
URLLC Ultra-Reliable Low-Latency Communication Those skilled in the art will recognize improvements and modifications to the embodiments of the present disclosure. All such improvements and modifications are considered within the scope of the concepts disclosed herein.

What is claimed is:

1. A User Equipment, UE, for a cellular communications system where the cellular communications system operates as a plurality of Ethernet network virtual bridges, the UE comprising:
one or more transmitters;
one or more receivers; and
processing circuitry associated with the one or more transmitters and the one or more receivers, the processing circuitry configured to cause the UE to:
establish a first Protocol Data Unit, PDU, session to an Ethernet network via a first User Plane Function, UPF, PDU sessions that connect to the Ethernet network via the first UPF being grouped into a first Ethernet network virtual bridge;
establish a second PDU session;
determine that both the first PDU session and the second PDU session are established to the Ethernet network via the first UPF,
in response to determining that both the first PDU session and the second PDU session are established to the Ethernet network via the first UPF, cause the UE to release one of the first PDU session and the second PDU session;
cause the UE to establish a third PDU session to the Ethernet network via a second UPF, PDU sessions that connect to the Ethernet network via the second UPF being grouped into a second Ethernet network virtual bridge; and
cause an interim bridge to be established to connect the first Ethernet network virtual bridge and the second Ethernet network virtual bridge.

2. The UE of claim 1, wherein, in order to cause the UE to determine that both the first PDU session and the second PDU session are established to the Ethernet network via the first UPF, the processing circuitry is further configured to cause the UE to determine that both the first and second PDU sessions are established to the Ethernet network via the first UPF using a neighbor discovery protocol.

3. The UE of claim 1, wherein, in order to cause the UE to determine that both the first PDU session and the second PDU session are established to the Ethernet network via the first UPF, the processing circuitry is further configured to cause the UE to determine that both the first and second PDU sessions are established to the Ethernet network via the first UPF based on UPF identities obtained from the cellular communications system in association with the first PDU session and the second PDU session.

4. The UE of claim 1, wherein all PDU sessions that connect to the Ethernet network via the first UPF are grouped into the first Ethernet network virtual bridge.

5. The UE of claim 1, wherein an identity of the first Ethernet network virtual bridge is bound to an identity of the first UPF.

6. The UE of claim 1, wherein the Ethernet network is a Time-Sensitive Networking, TSN, network, and capabilities of each port in the UE are integrated as parts of a configuration of the first Ethernet network virtual bridge, which is notified to a TSN Application Function, AF, and delivered to a Centralized Network Controller, CNC, for TSN bridge registration and modification.

7. The UE of claim 1, wherein all PDU sessions that connect to the Ethernet network via a third UPF are grouped into the second Ethernet network virtual bridge.

8. The UE of claim 1, wherein the UE is communicatively coupled to an Ethernet network end station for both the first PDU session and the third PDU session.

9. The UE of claim 1, wherein the UE is communicatively coupled to the Ethernet network end station for the first PDU session and the third PDU session via separate interfaces.

10. The UE of claim 1, wherein the UE is communicatively coupled to an Ethernet network end station for the first PDU session and the third PDU session via separate interfaces to an Ethernet network interim switch.

11. The UE of claim 1, wherein the Ethernet network is a Time-Sensitive Networking, TSN, network.

12. A User Equipment, UE, for a cellular communications system where the cellular communications system operates as a plurality of Ethernet network virtual bridges, the UE comprising a memory storing computer-executable instructions and a processor configured to execute the computer-executable instructions to cause the UE to:
establish a first PDU session to an Ethernet network via a first User Plane Function, UPF, Protocol Data Unit, PDU, sessions that connect to the Ethernet network via the first UPF being grouped into a first Ethernet network virtual bridge;
establish a second PDU session;
determine that both the first PDU session and the second PDU session are established to the Ethernet network via the first UPF,
in response to determining that both the first PDU session and the second PDU session are established to the Ethernet network via the first UPF, cause the UE to release one of the first PDU session and the second PDU session;

cause the UE to establish a third PDU session to the Ethernet network via a second UPF, PDU sessions that connect to the Ethernet network via the second UPF being grouped into a second Ethernet network virtual bridge; and cause an interim bridge to be established to connect the first Ethernet network virtual bridge and the second Ethernet network virtual bridge.

13. The UE of claim 12, wherein all PDU sessions that connect to the Ethernet network via the first UPF are grouped into the first Ethernet network virtual bridge.

14. The UE of claim 12, wherein an identity of the first Ethernet network virtual bridge is bound to an identity of the first UPF.

15. The UE of claim 12, wherein the Ethernet network is a Time-Sensitive Networking, TSN, network, and capabilities of each port in the UE are integrated as parts of a configuration of the first Ethernet network virtual bridge, which is notified to a TSN Application Function, AF, and delivered to a Centralized Network Controller, CNC, for TSN bridge registration and modification.

16. The UE of claim 12, wherein all PDU sessions that connect to the Ethernet network via the second UPF are grouped into the second Ethernet network virtual bridge.

17. The UE of claim 12, wherein the UE is communicatively coupled to an Ethernet network end station for both the first PDU session and the third PDU session.

18. The UE of claim 12, wherein the UE is communicatively coupled to an Ethernet network end station for the first PDU session and the third PDU session via separate interfaces.

* * * * *